(12) United States Patent
Ganz

(10) Patent No.: US 9,306,036 B2
(45) Date of Patent: Apr. 5, 2016

(54) NITRIDE SPACER FOR PROTECTING A FIN-SHAPED FIELD EFFECT TRANSISTOR (FINFET) DEVICE

(71) Applicant: GLOBALFOUNDRIES Inc., Grand Cayman (KY)

(72) Inventor: Michael Ganz, Clifton Park, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 13/953,833

(22) Filed: Jul. 30, 2013

(65) Prior Publication Data

US 2015/0035016 A1    Feb. 5, 2015

(51) Int. Cl.
*H01L 29/66* (2006.01)
*H01L 29/78* (2006.01)

(52) U.S. Cl.
CPC ........ *H01L 29/66795* (2013.01); *H01L 29/785* (2013.01)

(58) Field of Classification Search
CPC ..................... H01L 21/823431; H01L 29/785; H01L 29/66795
See application file for complete search history.

(56) References Cited

U.S. PATENT DOCUMENTS

| 5,075,240 | A | * | 12/1991 | Yama et al. | 438/227 |
|---|---|---|---|---|---|
| 6,319,843 | B1 | * | 11/2001 | Lyons | 438/724 |
| 7,297,600 | B2 | | 11/2007 | Oh et al. | |
| 7,745,871 | B2 | | 6/2010 | Oh et al. | |
| 8,716,797 | B2 | | 5/2014 | Basker et al. | |
| 8,765,546 | B1 | | 7/2014 | Hung et al. | |
| 2005/0093074 | A1 | * | 5/2005 | Anderson et al. | 257/365 |
| 2005/0186742 | A1 | | 8/2005 | Oh et al. | |
| 2005/0272192 | A1 | | 12/2005 | Oh et al. | |
| 2008/0029828 | A1 | | 2/2008 | Oh et al. | |
| 2011/0147846 | A1 | * | 6/2011 | Su et al. | 257/368 |
| 2011/0201164 | A1 | * | 8/2011 | Chung et al. | 438/229 |

* cited by examiner

*Primary Examiner* — Victor A Mandala
*Assistant Examiner* — Quovaunda V Jefferson
(74) *Attorney, Agent, or Firm* — Williams Morgan, P.C.

(57) ABSTRACT

Approaches for protecting a semiconductor device (e.g., a fin field effect transistor device (FinFET)) using a nitride spacer are provided. Specifically, a nitride spacer is formed over an oxide and a set of fins of the FinFET device to mitigate damage during subsequent processing. The nitride spacer is deposited before the block layers to protect the oxide on top of a set of gates in an open area of the FinFET device uncovered by a photoresist. The oxide on top of each gate will be preserved throughout all of the block layers to provide hardmask protection during subsequent source/drain epitaxial layering. Furthermore, the fins that are open and uncovered by the photoresist or the set of gates remain protected by the nitride spacer. Accordingly, fin erosion caused by amorphization of the fins exposed to resist strip processes is prevented, resulting in improved device yield.

20 Claims, 7 Drawing Sheets

NITRIDE SPACER FOR PROTECTING A FIN-SHAPED FIELD EFFECT TRANSISTOR (FINFET) DEVICE

BACKGROUND

1. Technical Field

This invention relates generally to the field of semiconductors, and more particularly, to forming a nitride spacer to protect a finFET device.

2. Related Art

A typical integrated circuit (IC) chip includes a stack of several levels or sequentially formed layers of shapes. Each layer is stacked or overlaid on a prior layer and patterned to form the shapes that define devices (e.g., field effect transistors (FETs)) and connect the devices into circuits. In a typical state of the art complementary insulated gate FET process, such as what is normally referred to as CMOS, layers are formed on a wafer to form the devices on a surface of the wafer. Further, the surface may be the surface of a silicon layer on a silicon on insulator (SOI) wafer. A simple FET is formed by the intersection of two shapes, a gate layer rectangle on a silicon island formed from the silicon surface layer. Each of these layers of shapes, also known as mask levels or layers, may be created or printed optically through well known photolithographic masking, developing and level definition, e.g., etching, implanting, deposition, etc.

The FinFET is a transistor design that attempts to overcome the issues of short-channel effect encountered by deep submicron transistors, such as drain-induced barrier lowering (DIBL). Such effects make it harder for the voltage on a gate electrode to deplete the channel underneath and stop the flow of carriers through the channel—in other words, to turn the transistor off. By raising the channel above the surface of the wafer instead of creating the channel just below the surface, it is possible to wrap the gate around all but one of its sides, providing much greater electrostatic control over the carriers within it.

In FinFET technology, preservation of the cap oxide on top of the gate, gate oxide around the fins, and the fin profiles is critical for the development of device yield. However, with current approaches, the oxide on top of the gates, gate oxide, as well as the fins, are eroded after the post-PC block implant layering. For example, as shown in the prior art device 100 of FIGS. 1(a)-1(b), oxide 102 on top of each gate 104 is left open post lithography and development, which exposes oxide 102 and fins 106 to all processing steps that follow (e.g., descum, implants, resist strips, etc.).

Furthermore, in areas of device 100 where there are no gates covering fins 106, there is vulnerability to gate oxide 102 and fins 106 themselves. That is, following the implants, photoresist 108 will be stripped using certain clean and ashing processes. These can affect the implanted oxide as well as amorphized fins 106. The y-cut area that includes the gates experiences some oxide loss on top of gates 104 in the areas that were uncovered by resist 108. The properties of oxide 102 on top of each gate 104 are changed post implantation, therefore weakening oxide 102. As a result, when resist 108 is stripped away, oxide 102 in the open area is stripped from the top of each gate 104. This is problematic because oxide 102 protects the nitride hardmask during subsequent formation of the source/drain (S/D) epitaxial layers. If there is no oxide remaining at the time of S/D epitaxial layer processing, the reactive ion etch (RIE) processes used will destroy this hardmask, causing a misprocess. In the x-cut area that has open fin area (e.g., shown in FIG. 2(b)), the fins become amorphized post implantation, weakening the silicon so that the cleans processes are able to erode the tops of fins 206, as shown in FIG. 2(a). Fin erosion is problematic because the fins in finFET technology are the channels. If the channels are damaged, all electrical parameters are negatively affected.

SUMMARY

In general, approaches for forming a nitride spacer to protect a semiconductor device (e.g., a fin field effect transistor device (FinFET)) are provided. Specifically, approaches are provided for forming a nitride spacer over an oxide and a set of fins of the FinFET device to mitigate damage during subsequent processing. The nitride spacer is deposited before the block layers to protect the oxide on top of a set of gates in an open area of the FinFET device uncovered by a photoresist. The oxide on top of each gate will be preserved throughout all of the block layers to provide hardmask protection during subsequent source/drain epitaxial layering. Furthermore, the fins that are open and uncovered by the photoresist or gates remain protected by the nitride spacer. Accordingly, fin erosion caused by amorphization of the fins exposed to resist strip processes is prevented, resulting in improved device yield.

One aspect of the present invention includes a method for forming a device, the method comprising: forming a set of gate structures over a finned substrate, each of the set of gate structures comprising a nitride capping layer; forming an oxide over the nitride capping layer; and forming a nitride spacer over the oxide.

Another aspect of the present invention includes a method for forming a nitride spacer to protect a fin-shaped field effect transistor (FinFET) device, the method comprising: forming a set of gate structures over a finned substrate, each of the set of gate structures comprising a nitride capping layer; forming an oxide over the nitride capping layer; and forming a nitride spacer over the oxide.

Yet another aspect of the present invention includes a fin-shaped field effect transistor (FinFET) device, comprising: a set of gate structures formed over a finned substrate, each of the set of gate structures comprising a nitride capping layer; an oxide formed over the nitride capping layer; and a nitride spacer formed over the oxide.

BRIEF DESCRIPTION OF THE DRAWINGS

These and other features of this invention will be more readily understood from the following detailed description of the various aspects of the invention taken in conjunction with the accompanying drawings in which.

Figure 1A:
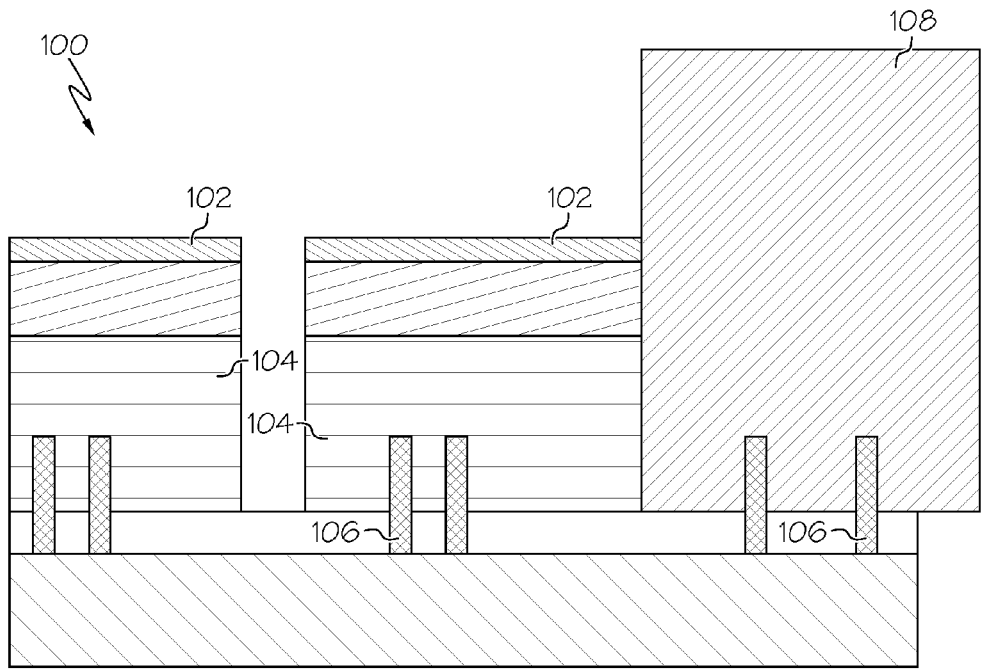
FIG. 1(a) shows a cross-sectional view of a prior art approach for forming a FinFET semiconductor device.
Figure 1B:
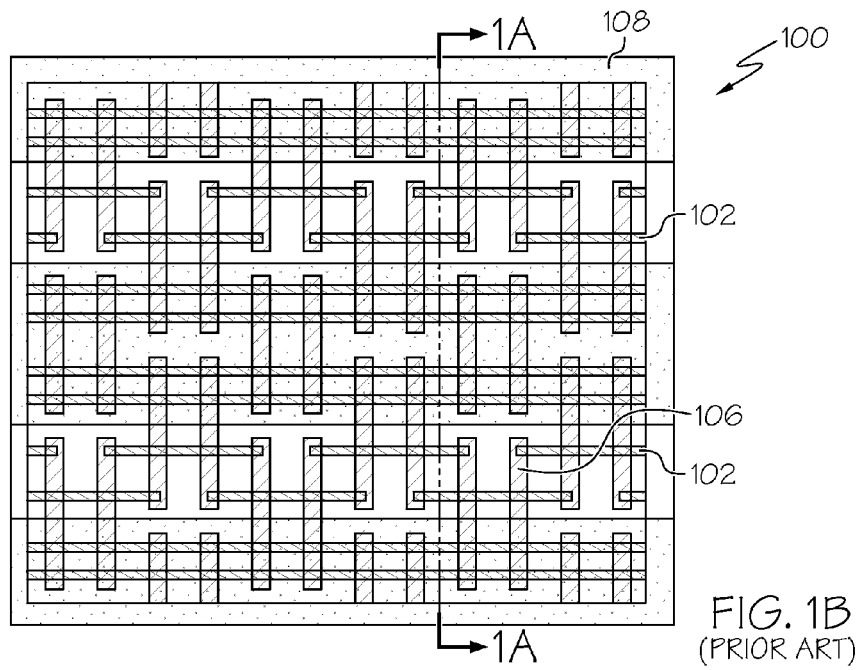
FIG. 1(b) shows a top view of the prior art approach for forming the FinFET semiconductor device of FIG. 1(a).
Figure 2A:
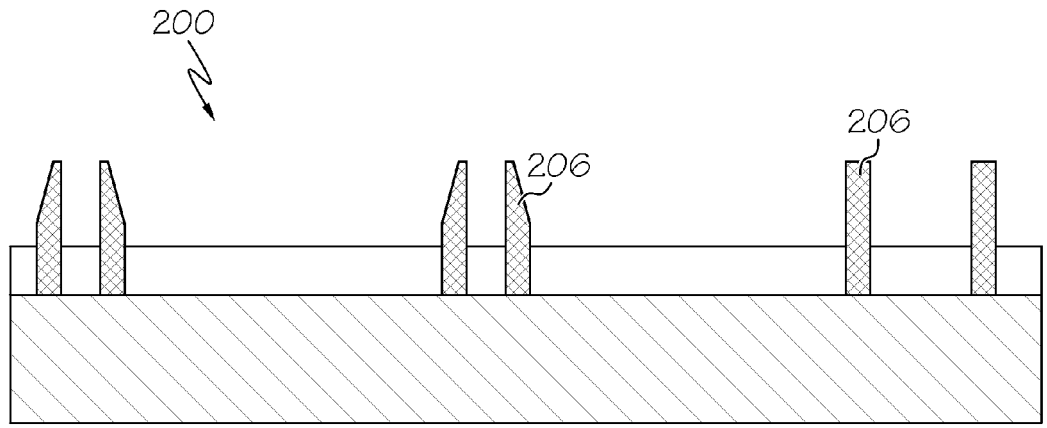
FIG. 2(a) shows a cross-sectional view of a prior art approach for forming a FinFET semiconductor device.
Figure 2B:
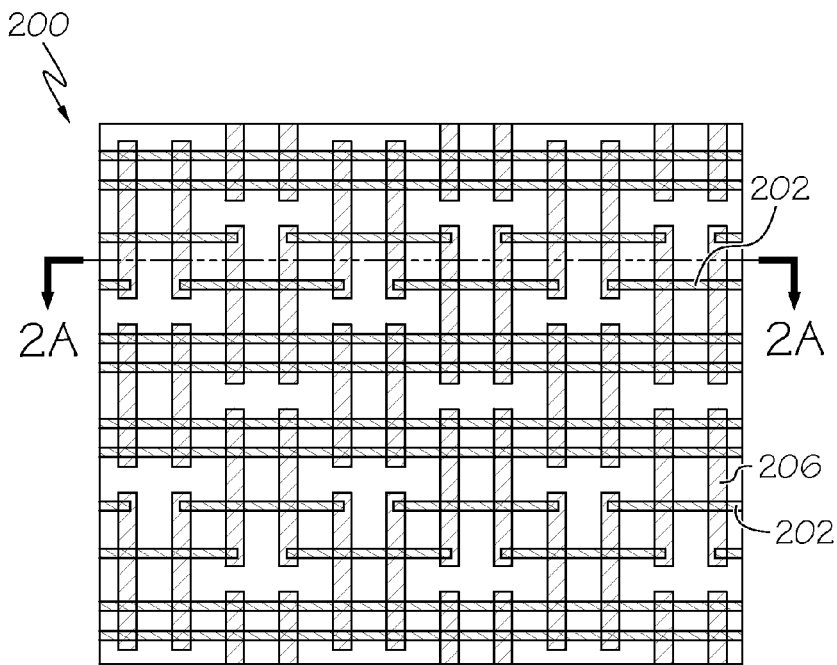
FIG. 2(b) shows a top view of the prior art approach for forming the FinFET semiconductor device of FIG. 2(a).

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Exemplary embodiments will now be described more fully herein with reference to the accompanying drawings, in which exemplary embodiments are shown. It will be appreciated that this disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art.

As mentioned above, disclosed herein are approaches for forming a nitride spacer to protect a FinFET device. Specifically, approaches are provided for forming a nitride spacer over an oxide and a set of fins of the FinFET device to mitigate damage during subsequent processing. The nitride spacer is deposited before the block layers to protect the oxide on top of a set of gates in an open area of the FinFET device uncovered by a photoresist. The oxide on top of each gate will be preserved throughout all of the block layers to provide hardmask protection during subsequent source/drain epitaxial layering. Furthermore, the fins that are open and uncovered by the photoresist or set of gates remain protected by the nitride spacer. Accordingly, fin erosion caused by amorphization of the fins exposed to resist strip processes is prevented.

The terminology used herein is for the purpose of describing particular embodiments only and is not intended to be limiting of this disclosure. For example, as used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," "exemplary embodiments," or similar language means that a particular feature, structure, or characteristic described in connection with the embodiment is included in at least one embodiment of the present invention. Thus, appearances of the phrases "in one embodiment," "in an embodiment," "in embodiments" and similar language throughout this specification may, but do not necessarily, all refer to the same embodiment.

The terms "overlying" or "atop", "positioned on" or "positioned atop", "underlying", "beneath" or "below" mean that a first element, such as a first structure, e.g., a first layer, is present on a second element, such as a second structure, e.g. a second layer, wherein intervening elements, such as an interface structure, e.g. interface layer, may be present between the first element and the second element.

As used herein, "depositing" may include any now known or later developed techniques appropriate for the material to be deposited including but not limited to, for example: chemical vapor deposition (CVD), low-pressure CVD (LPCVD), plasma-enhanced CVD (PECVD), semi-atmosphere CVD (SACVD) and high density plasma CVD (HDPCVD), rapid thermal CVD (RTCVD), ultra-high vacuum CVD (UHVCVD), limited reaction processing CVD (LRPCVD), metal-organic CVD (MOCVD), sputtering deposition, ion beam deposition, electron beam deposition, laser assisted deposition, thermal oxidation, thermal nitridation, spin-on methods, physical vapor deposition (PVD), atomic layer deposition (ALD), chemical oxidation, molecular beam epitaxy (MBE), plating, evaporation.

Figure 3A:
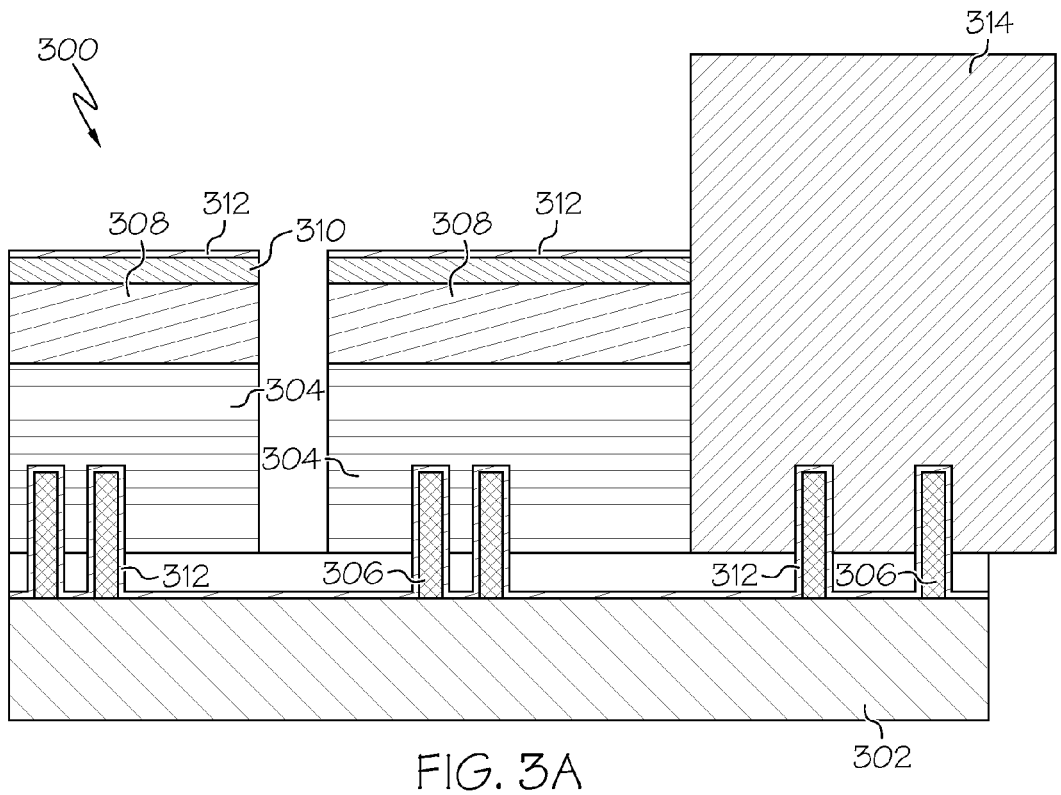
FIG. 3(a) shows a cross-sectional view of an approach for forming a FinFET semiconductor device according to illustrative embodiments.
Figure 3B:
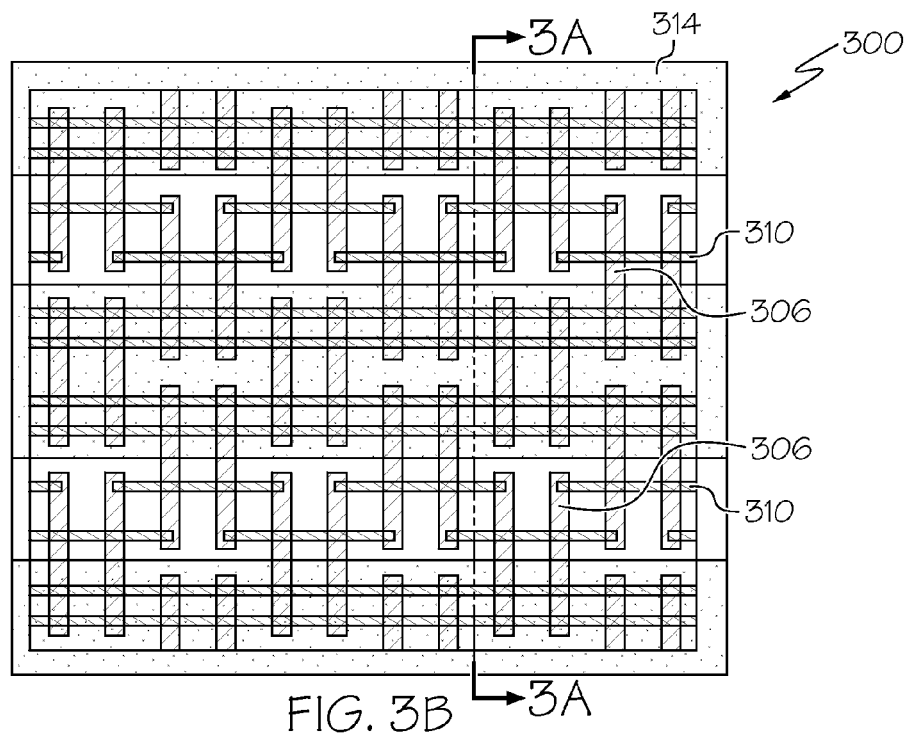
FIG. 3(b) shows a top view of the approach for forming the FinFET semiconductor device of FIG. 3(a) according to illustrative embodiments.

With reference again to the figures, FIGS. 3(a)-(b) demonstrate an approach for forming a nitride spacer over an oxide and a set of fins of the FinFET device to mitigate damage during subsequent processing according to an illustrative embodiment of the invention. As shown in FIG. 3(a), which is a side view along cut line 3A-3A from top view FIG. 3(b), device 300 comprises a substrate 302 and a set of gate structures 304 (e.g., FinFETs) formed over a set of fins 306 patterned from substrate 302. Each gate structure 304 comprises a nitride capping layer 308 (e.g., silicon nitride (SiN)) formed atop a gate dielectric of gate structure 304. Nitride capping layer 308 may be formed using processes such as, physical vapor deposition (PVD), CVD, plasma-enhanced chemical vapor deposition (PECVD), atmospheric pressure chemical vapor deposition (APCVD), low-pressure CVD (LPCVD), high density plasma CVD (HD CVD), atomic layer CVD (ALCVD), and/or other suitable processes which may be followed, for example, by photolithography and/or etching processes. As further shown, each gate structure 304 comprises an oxide 310 formed over the nitride capping layer 308.

The term "substrate" as used herein is intended to include a semiconductor substrate, a semiconductor epitaxial layer deposited or otherwise formed on a semiconductor substrate and/or any other type of semiconductor body, and all such structures are contemplated as falling within the scope of the present invention. For example, the semiconductor substrate may comprise a semiconductor wafer (e.g., silicon, SiGe, or an SOI wafer) or one or more die on a wafer, and any epitaxial layers or other type semiconductor layers formed thereover or associated therewith. A portion or entire semiconductor substrate may be amorphous, polycrystalline, or single-crystalline. In addition to the aforementioned types of semiconductor substrates, the semiconductor substrate employed in the present invention may also comprise a hybrid oriented (HOT) semiconductor substrate in which the HOT substrate has surface regions of different crystallographic orientation. The semiconductor substrate may be doped, undoped or contain doped regions and undoped regions therein. The semiconductor substrate may contain regions with strain and regions without strain therein, or contain regions of tensile strain and compressive strain.

Gate structures 304 may be fabricated using any suitable process including one or more photolithography and etch processes. The photolithography process may include forming a photoresist layer (not shown) overlying substrate 302 (e.g., on a silicon layer), exposing the resist to a pattern, performing post-exposure bake processes, and developing the resist to form a masking element including the resist. The masking element may then be used to etch each gate 304 into the silicon layer, e.g., using reactive ion etch (RIE) and/or other suitable processes.

In one embodiment, gate structures 304 are formed by a double-patterning lithography (DPL) process. DPL is a method of constructing a pattern on a substrate by dividing the pattern into two interleaved patterns. DPL allows enhanced feature (e.g., fin) density. In this embodiment, gate structures 304 each include a gate electrode. Numerous other layers may also be present, for example, a gate dielectric layer, interface layers, and/or other suitable features. The gate dielectric layer may include dielectric material such as, silicon oxide, silicon nitride, silicon oxinitride, dielectric with a high dielectric constant (high k), and/or combinations thereof. Examples of high k materials include hafnium silicate, hafnium oxide, zirconium oxide, aluminum oxide, hafnium dioxide-alumina ($HfO_2$—$Al_2O_3$) alloy, and/or combinations thereof. The gate dielectric layer may be formed using processes such as, photolithography patterning, oxidation, deposition, etching, and/or other suitable processes. The gate electrode may include polysilicon, silicon-germanium, a metal including metal compounds such as, Mo, Cu, W, Ti, Ta, TiN, TaN, NiSi, CoSi, and/or other suitable conductive materials known in the art. The gate electrode may be formed using processes such as, physical vapor deposition (PVD), CVD, plasma-enhanced chemical vapor deposition (PECVD), atmospheric pressure chemical vapor deposition (APCVD), low-pressure CVD (LPCVD), high density plasma CVD (HD CVD), atomic layer CVD (ALCVD), and/or other suitable processes which may be followed, for example, by photolithography and/or etching processes.

Device 300 further comprises a nitride spacer (e.g., SiN) 312 formed over oxide 310, shown post lithography and development in a block layer in FIG. 3(a). As demonstrated, the open area uncovered by a photoresist 314 and oxide 310 on top of gates 304 is now protected by nitride spacer 312. In the x-cut area, fins 306 that are open and uncovered by photoresist 314 and gates 304 are also protected by nitride spacer 312. In one embodiment, nitride spacer 312 can be formed from silicon by thermal or plasma conversion of silicon into nitride, i.e., by thermal nitridation or by plasma nitridation of silicon. Alternately, nitride spacer 312 can be formed by deposition of silicon nitride, for example, by chemical vapor deposition (CVD), or by plasma oxidation.

Figure 4A:
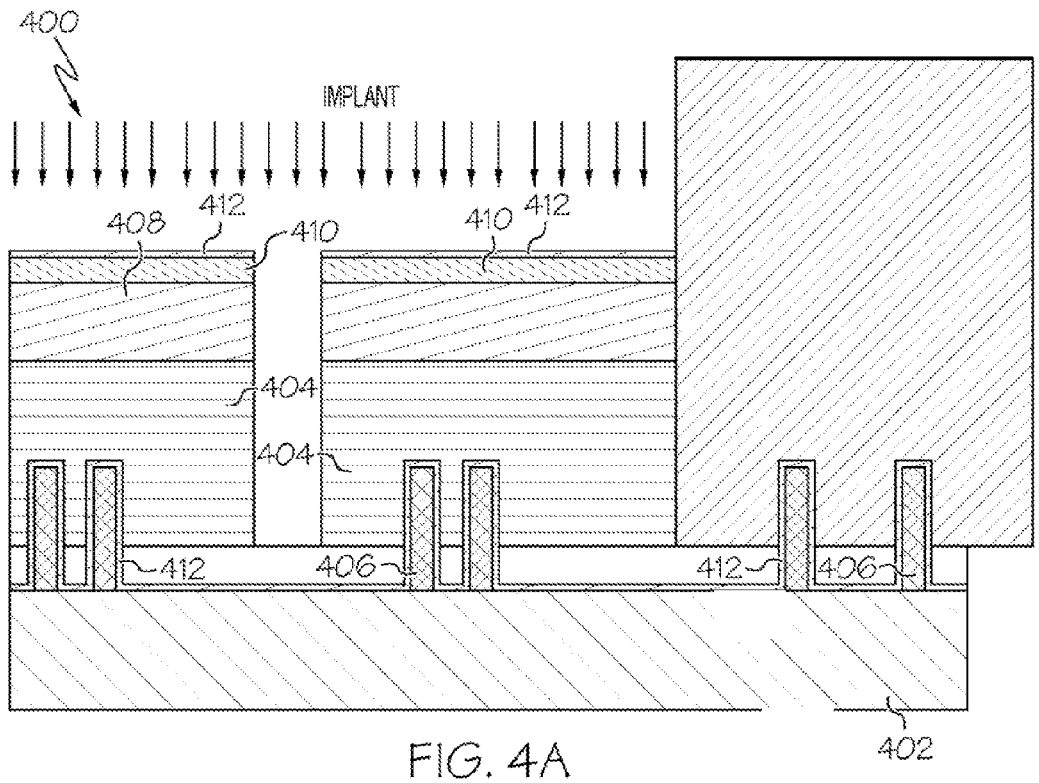
FIG. 4(a) shows a cross-sectional view of an approach for forming a FinFET semiconductor device according to illustrative embodiments.
Figure 4B:
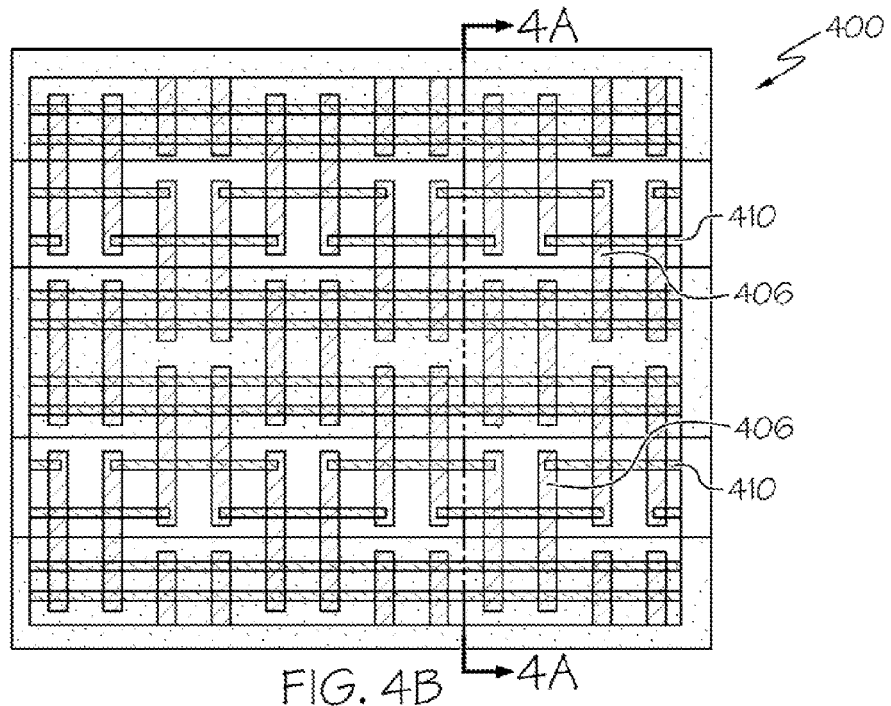
FIG. 4(b) shows a top view of the approach for forming the FinFET semiconductor device of FIG. 4(a) according to illustrative embodiments.
Figure 5A:
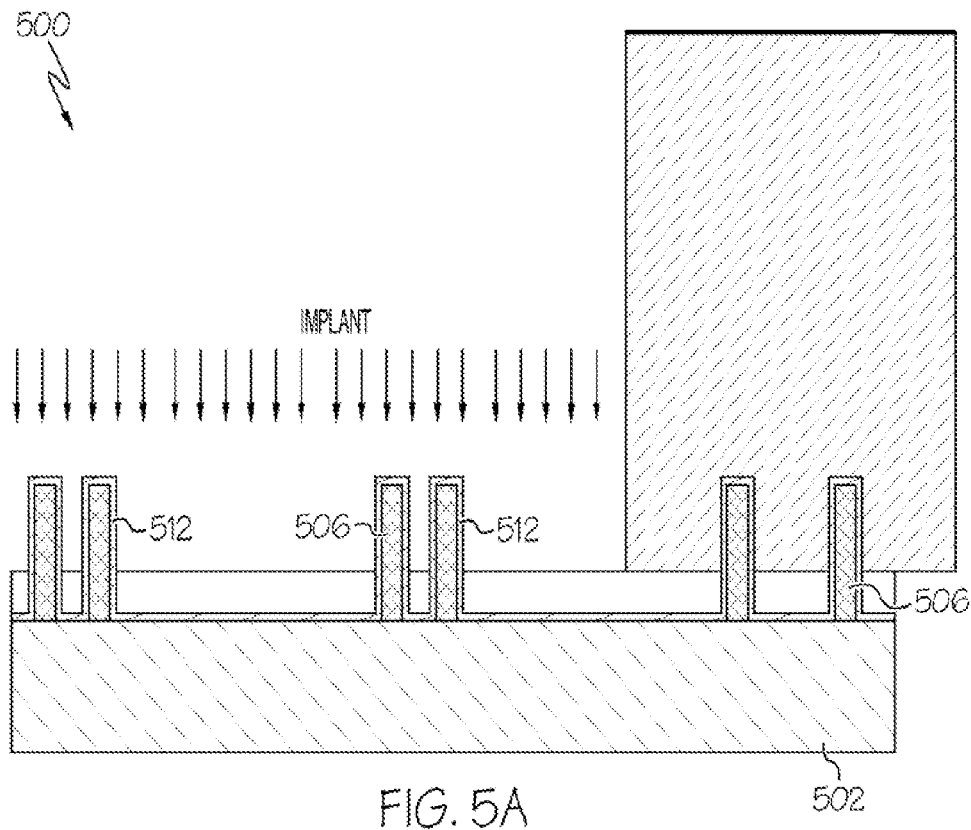
FIG. 5(a) shows a cross-sectional view of an approach for forming a FinFET semiconductor device according to illustrative embodiments.
Figure 5B:
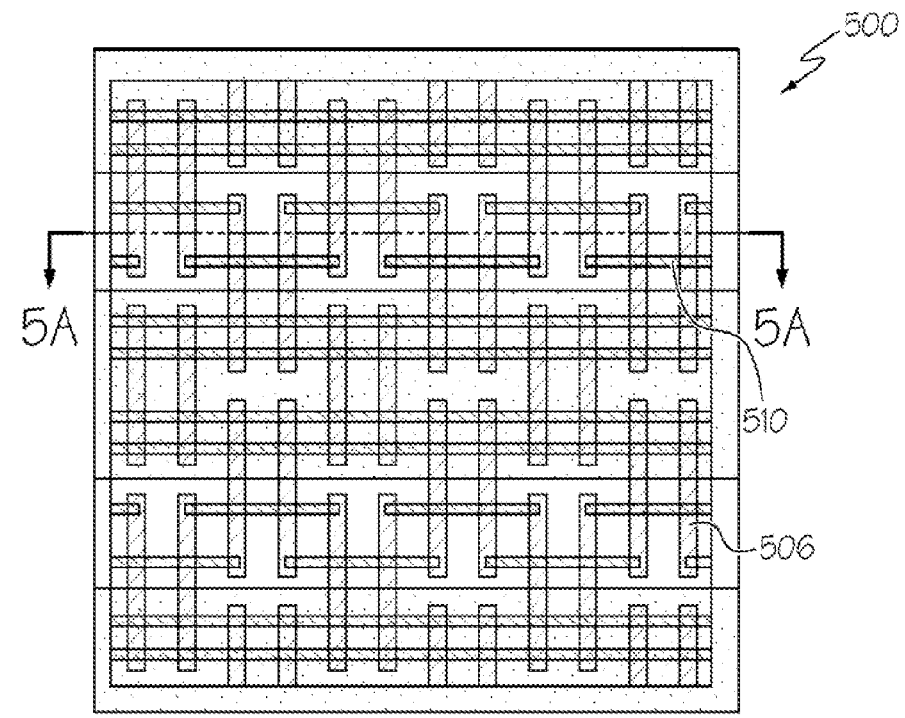
FIG. 5(b) shows a top view of the approach for forming the FinFET semiconductor device of FIG. 5(a) according to illustrative embodiments.

Turning now to FIGS. 4(a)-(b), FinFET device 400, having nitride spacer 412 formed over oxide 410 and set of fins 406, will be described in greater detail. As shown in FIG. 4(a), which is a side view along cut line 4A-4A from top view FIG. 4(b), device 400 is subsequently implanted (indicated by arrows). Here, nitride spacer 412 protects oxide 410 on top of gates 404 and, therefore, implants will not adversely alter the properties of oxide 410. This in turn will help to avoid oxide loss that is seen in conventional approaches after the resist strip processes. FIGS. 5(a)-5(b) show that fins 506 in the area without gates are fully protected using nitride spacer 512 as well. Fins 506 will still become amorphized because of the implantation energy, but the resist strip process will not reach fins 506 because of the protection provided by nitride spacer 512. This helps prevent fin erosion caused by amorphized fins 506 being susceptible to the resist strips.

Figure 6A:
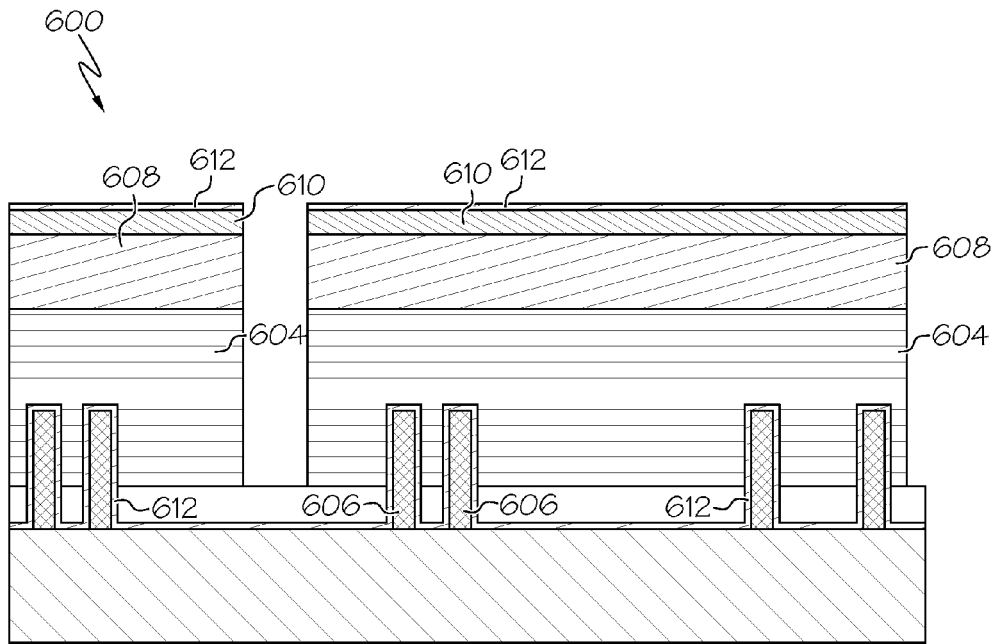
FIG. 6(a) shows a cross-sectional view of an approach for forming a FinFET semiconductor device according to illustrative embodiments.
Figure 6B:
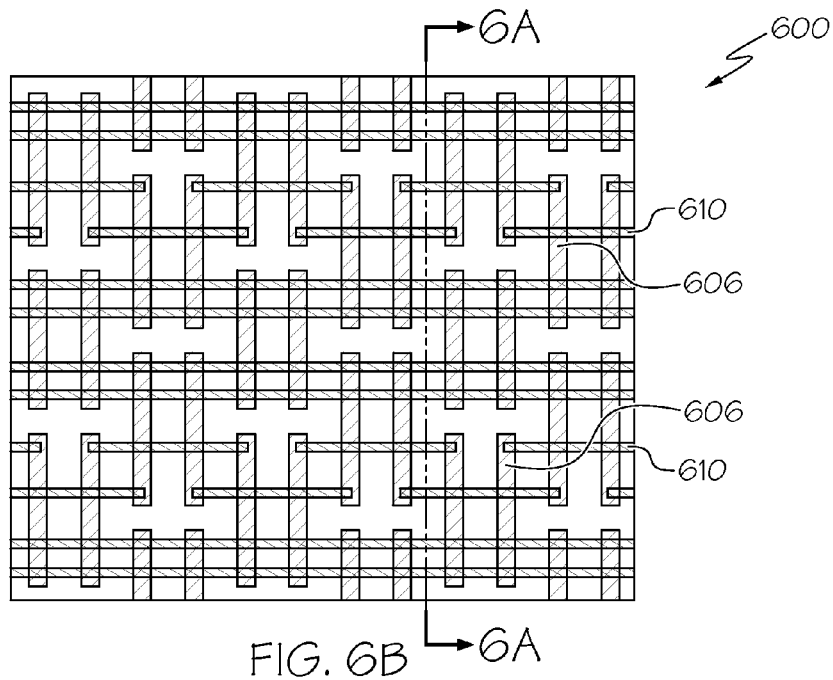
FIG. 6(b) shows a top view of the approach for forming the FinFET semiconductor device of FIG. 6(a) according to illustrative embodiments.
Figure 7A:
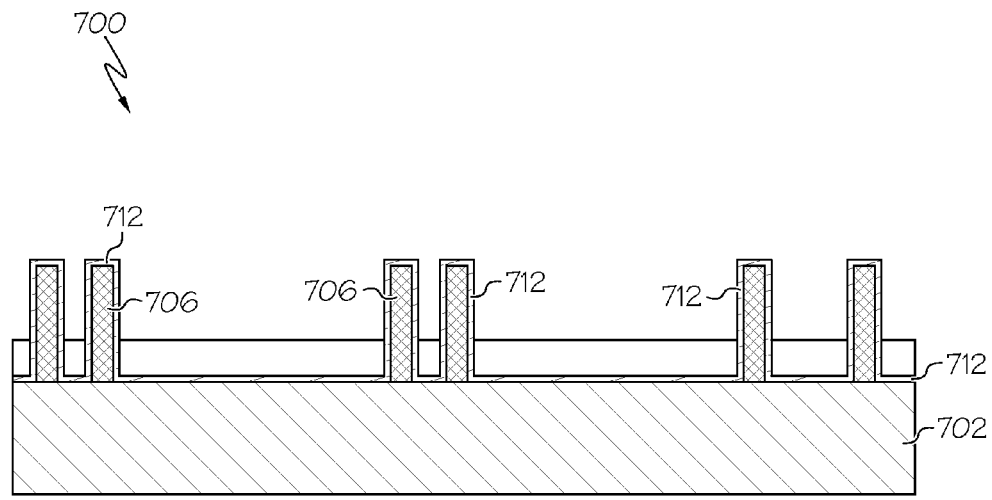
FIG. 7(a) shows a cross-sectional view of an approach for forming a FinFET semiconductor device according to illustrative embodiments.
Figure 7B:
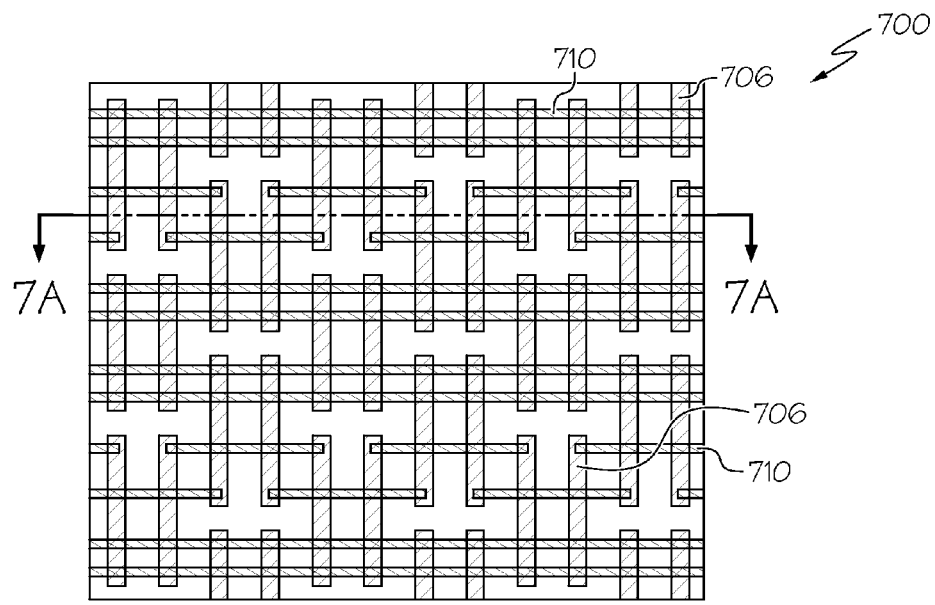
FIG. 7(b) shows a top view of the approach for forming the FinFET semiconductor device of FIG. 7(a) according to illustrative embodiments.

Turning now to FIGS. 6(a)-(b), the effect on oxide 610 and fins 606 by the resist strip process is shown. As demonstrated in FIG. 6(a), which is a side view along cut line 6A-6A from top view FIG. 6(b), nitride spacer 612 is able to preserve oxide 610 on top of gates 604 following a resist strip process. Nitride spacer 612 helps eliminate or reduce a non-uniform oxide profile in which the oxide on top of the gate is eroded by the strip processes. As shown, nitride spacer 612 is still preserved on top of gates 604 to protect it throughout all of the block layers. This uniform profile of oxide 610 is beneficial, as it is needed for hardmask protection for subsequent S/D epitaxial layer processing. In FIGS. 7(a)-(b), the x-cut profile post strip processes using nitride spacer 712 is shown. Here, it is again demonstrated that fins 706 are fully preserved using nitride spacer 712. By preserving fins 706 through the processing steps shown, device yield degradation is reduced.

It will be appreciated that nitride spacer 712 will not prevent fin amorphization, which results following formation of the post-PC implant block layers. Instead, nitride spacer 712 prevents amorphized fins 706 from being eroded from the resist strip processes that fins 706 experience. Although not shown, before subsequent S/D epitaxial layer formation, an annealing step may be performed to recrystallize fins 706 back to a former profile. Nitride spacer 712 aids in preserving this profile.

It will be further appreciated that at least the following advantages are realized by the approaches provided herein. First, the oxide on top of each gate will be preserved throughout all of the block layers to provide hardmask protection in S/D epitaxial layers. Second, fin erosion seen from amorphized fins being exposed to resist strip processes will be prevented, and therefore device yield will be improved.

In various embodiments, design tools can be provided and configured to create the datasets used to pattern the semiconductor layers as described herein. For example data sets can be created to generate photomasks used during lithography operations to pattern the layers for structures as described herein, including a set of gate structures formed over a substrate, each of the set of gate structures comprising a nitride capping layer, an oxide formed over the nitride capping layer, and a nitride spacer formed over the oxide. Such design tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

It is apparent that there has been provided methods for forming a nitride spacer to protect a FinFET device. While the invention has been particularly shown and described in conjunction with exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the formation and/or processing of structures illustrated and described herein as well as in association with other structures not illustrated. Therefore, it is to be understood that the appended claims are intended to cover all such modifications and changes that fall within the true spirit of the invention.

What is claimed is:

1. A method for forming a device, the method comprising:
    forming a set of gate structures over a set of fins, each of the set of gate structures comprising a nitride capping layer;
    forming an oxide over the nitride capping layer;
    forming a nitride spacer over the oxide, wherein fins that are uncovered by the set of gate structures are covered by the nitride spacer; and
    forming at least one source/drain epitaxial layer on the device.

2. The method according to claim 1, further comprising forming the set of fins from a substrate.

3. The method according to claim 1, further comprising forming a photoresist over the device.

4. The method according to claim 3, further comprising implanting the device.

5. The method according to claim 4, further comprising removing the photoresist.

6. The method according to claim 1, the forming the nitride spacer comprising depositing nitride using a plasma oxidation process.

7. The method according to claim 1, the nitride capping layer comprising silicon nitride.

8. A method for forming a nitride spacer to protect a fin-shaped field effect transistor (FinFET) device, the method comprising:
    forming a set of gate structures over a set of fins, each of the set of gate structures comprising a nitride capping layer;
    forming an oxide over the nitride capping layer;
    forming a nitride spacer over the oxide, wherein fins that are uncovered by the set of gate structures are covered by the nitride spacer; and
    forming at least one source/drain epitaxial layer on the device.

9. The method according to claim 8, further comprising forming the set of fins from a substrate.

10. The method according to claim 8, further comprising forming a photoresist over the device.

11. The method according to claim 10, further comprising implanting the device.

12. The method according to claim 11, further comprising removing the photoresist.

13. The method according to claim 8, the forming the nitride spacer comprising depositing nitride using a plasma oxidation process.

14. The method according to claim 8, the nitride capping layer comprising silicon nitride.

15. A fin-shaped field effect transistor (FinFET) device, comprising:
    a set of gate structures formed over a set of fins, each of the set of gate structures comprising a nitride capping layer;
    an oxide formed over the nitride capping layer;
    a nitride spacer formed over the oxide, wherein fins that are uncovered by the set of gate structures are covered by the nitride spacer; and
    at least one source/drain epitaxial layer over the nitride spacer.

16. The FinFET device according to claim 15, further comprising the set of fins from a substrate.

17. The FinFET device according to claim 16, further comprising a photoresist formed over the device.

18. The FinFET device according to claim 16, the nitride spacer formed over the nitride capping layer and the set of fins prior to an implant to the FinFET device.

19. The FinFET device according to claim 15, the nitride spacer comprising silicon nitride.

20. The FinFET device according to claim 15, the nitride capping layer comprising silicon nitride.

* * * * *